BEST AVAILABLE COPY

H. B. MEECH.

Assignor to B. F. BROWN.

Manufacture of Paper-Pulp from Wood.

No. 8,258. Reissued May 28, 1878.

WITNESSES

Wm A Skinkle

Robert Dean Buchanan.

INVENTOR

Harrison B. Meech.

By his Attorneys

Baldwin, Hopkins & Peyton.

UNITED STATES PATENT OFFICE.

HARRISON B. MEECH, OF CHATHAM VILLAGE, NEW YORK, ASSIGNOR TO BENJAMIN F. BROWN.

IMPROVEMENT IN THE MANUFACTURE OF PAPER-PULP FROM WOOD.

Specification forming part of Letters Patent No. 106,710, dated August 23, 1870; Reissue No. 8,258, dated May 28, 1878; application filed May 7, 1878.

DIVISION C.

*To all whom it may concern:*

Be it known that I, H. B. MEECH, formerly of Fort Edward, Washington county, State of New York, now of Chatham Village, New York, have invented a new and useful Improvement in the Art of Reducing Wood to Pulp by Grinding; and that the following, taken in connection with the drawings, is a full, clear, and exact description thereof.

Figure 1:
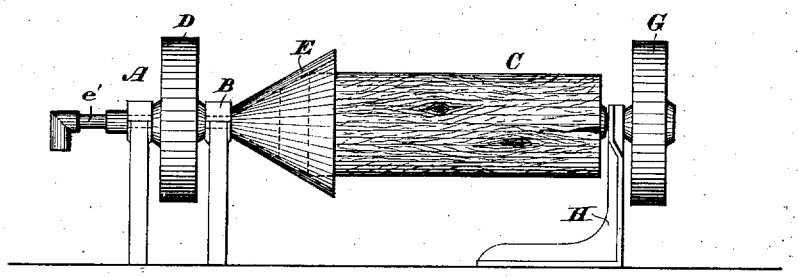
Figure 2:
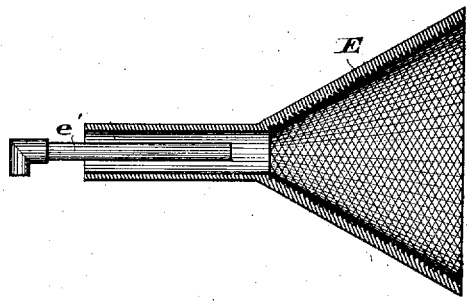

In the drawings, Figure 1 is a side elevation of the preferred grinding apparatus employed in carrying out my improvement in the art, and Fig. 2 is a vertical longitudinal section through the grinding-surface.

Prior to the date of my invention wood has been reduced to pulp by grinding the same on grinding-surfaces of various characters and forms, the fibers of the wood being presented in certain definite relations to such grinding-surfaces. For instance, in the method of Christian Voelter the wood was presented to the grinding-surface with its fibers perpendicular thereto, so that the surface attacked the ends of the fibers, and such fibers were, so to speak, cut or broken off.

In the Brooman method the wood was applied upon the convex periphery of a grindstone, with the length of the fibers thereof parallel to a tangent to the stone at the center of the piece of wood to be ground, so that the fibers were cut diagonally, or partly cut partly torn, out of the mass.

In the Henry Voelter method the fibers of the wood were intended to lie substantially in the plane or curve of the grinding-surface, and were attacked by the asperities of the grinding-surface in lines substantially perpendicular to the length of the fibers, so that the separate fibers were rolled out of the bundle of fibers which composed the block of wood. This latter method produced long and tolerably uniform fiber, with comparatively slight expenditure of power, but in practice rolls out the fiber, if anything, too easily, as both ends of any one fiber are unprotected, or not covered or confined by other overlying fibers; consequently there is little or no tearing apart or endwise pulling out of the fibers, and aggregations of several fibers sometimes separate as a bundle, and not as distinct and separate fibers.

In working out my improvement, I attack the fibers with the asperities of the grinding-surface in lines crosswise to the length of the fibers, as, or about as, Henry Voelter did; but I do not present the block of wood to the grinding-surface so that the fibers lie in the plane or curve of the grinding-surface or parallel thereto; but, on the contrary, I so present the wood that the length of the fibers is inclined to the grinding-surface in such manner that one end of every fiber which is being acted upon is covered up or confined and protected by other fibers, so that the asperities of the grinding-surface cannot act upon any fiber throughout the whole of its length, and in consequence I partially roll out, partially tear or pull out, fibers from the mass, the latter action freeing these fibers from those which cover or confine one of their ends.

This mode of treatment requires more expenditure of power for a definite weight of pulp than Henry Voelter's method, but the fiber produced is, I believe, more uniform and of better felting quality.

In order to work out my improvement in the art, the wood must be so presented or held in relation to the grinding-surface that the length of its fibers is inclined to the plane of the grinding-surface, and the grinding-surface must so move that its asperities attack the fibers in lines crossing the length of the fibers. I prefer that the asperities shall attack the fibers in lines perpendicular, or nearly so, to the length of the fiber; and in carrying out this my improvement in the art it is not necessary that any special form or kind of grinding-surface, or special means of supporting or feeding the block of wood, be employed, as the invention relates to the art, and not to the apparatus.

The apparatus I have devised for working out this improvement in the art is a concave conical grinding-surface, in connection with proper means for supporting the log or billet of wood and for rotating the grinding-surface; and this apparatus has this advantage, namely, that a whole log or round billet of wood may be ground up without cutting or splitting the same.

In the drawings this conical surface is the interior of a cone, which is represented at E as provided with a tubular prolongation which serves as a supporting-shaft, and this shaft (and consequently the grinding-surface) is mounted on proper journals A B, and provided with a belt-pulley, D, by means of which the grinder may be revolved rapidly. The log or billet to be ground is represented at C, with one end supported in the concavity of the grinder, while the other end is held by a dog entering the wood and secured to a shaft provided with a belt-pulley, G. This shaft is mounted upon a support or standard, H. By moving this support toward the grinder the log can be fed as it is ground away, and by giving motion to the pulleys, or one of them, either the log or the grinder, or both, may be revolved. The grinder is made of iron, with its grinding-surface picked or made rough like the surface of a file.

The lengths of the fibers extend, or are arranged naturally, substantially with the length of the log, and a consideration of Fig. 1 will show that the lengths of the fibers do not lie in the curve of the grinding-surface or any part thereof, or parallel to any part thereof, but that all the fibers are in the direction of their lengths inclined to the surface. Such consideration will further show that the end of the log is ground to a cone, and that the fibers composing or forming the surface of this cone are acted upon in part of their length in lines perpendicular to their length, or nearly so, by the asperities of the grinding-surface, which tend to roll out the fibers. It will further appear that those fibers which are being ground or acted upon by the asperities are exposed at those ends nearest the small end of the cone to the action of the asperities, while the other ends of these same fibers farthest from the small end of the cone and nearest the unground end of the log are covered by other fibers and are confined by them, so that the asperities of the stone must pull out, or tear out, or tear apart, such fibers as are separated during the operation. Hence it appears that my improvement in the art is worked out by this apparatus.

I prefer, when carrying out this process, to admit steam between the log and the grinding-surface through the pipe-*e'*, thereby softening the wood and facilitating the grinding; but do not claim this grinding in the presence of steam in this application as of my invention.

I claim as of my own invention—

The herein-described improvement in the art of reducing wood to pulp, which consists in grinding the wood by a grinding-surface when the fibers thereof are presented to such surface in such manner as to have one of their ends protected by other fibers, and also in such manner that the asperities of the surface act upon the fibers in lines crosswise of their length, substantially as specified.

H. B. MEECH.

Witnesses:

J. HENRY TAYLOR,
PHILIP H. CONDELL.